(12) United States Patent
Alexander et al.

(10) Patent No.: US 7,171,613 B1
(45) Date of Patent: Jan. 30, 2007

(54) WEB-BASED APPLICATION FOR INBOUND MESSAGE SYNCHRONIZATION

(75) Inventors: James P. Alexander, Toronto (CA); Kevin L. Sally, Markham (CA); Anthony L. Tjong, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 876 days.

(21) Appl. No.: 09/702,127

(22) Filed: Oct. 30, 2000

(51) Int. Cl.
G06F 15/00 (2006.01)
G06F 7/00 (2006.01)
G06F 17/30 (2006.01)
G06F 15/16 (2006.01)

(52) U.S. Cl. ............... 715/500.1; 715/511; 715/530; 707/10; 707/200; 709/207

(58) Field of Classification Search ............ 707/9–10, 707/200, 203; 705/1; 715/511, 530, 500.1; 709/223, 229, 246, 207
See application file for complete search history.

(56) References Cited

U.S. PATENT DOCUMENTS 5,428,645 A 6/1995 Dolev et al. ............ 375/354

(Continued)

FOREIGN PATENT DOCUMENTS

| EP | 178473 | 4/1986 |
|----|--------|--------|
| EP | 237106 | 9/1987 |
| EP | 0445954 | 9/1991 |
| EP | 0955742 | 11/1999 |
| JP | 6028199 | 2/1991 |
| JP | 06236333 A * | 8/1994 |

OTHER PUBLICATIONS

"Time Synchronization over the Internet Using an Adaptive Frequency-Locked Loop", Judah Levine, pp. 888-896.

(Continued)

Primary Examiner—William Bashore
Assistant Examiner—Chau Nguyen
(74) Attorney, Agent, or Firm—A. Bruce Clay; Hoffman, Warnick + D'Alessandro, LLC

(57) ABSTRACT

A Web-based computer system is provided with software for processing of inbound messages originating from a back office system. The computer system or web-based application may be operated to maintain the consistency of the information on both systems. A method of operating the computer system and application is also provided. The method, system and application accommodate use of multiple inbound queue server processes, multiple ports for sending messages from the back office system and multi-threaded processing in the web-based application system. The various inbound messages received by the web-based application system are processed in proper time sequence. Every document created by the back office system is identified with a unique primary key. The primary key identifies the type of document and the document number corresponding to the particular document. The document and a timestamp identifying the date and time of the document's creations are stored in the back office database. The web-based application system receives an inbound message including the document information from the back office system. Upon receipt, the web based application system searches a database listing primary key information of earlier received messages and compares the primary key information of the inbound message. If the primary key of the inbound message matches a stored primary key entry, the timestamps of the two messages are compared. The message having the later timestamp is identified as the most current version and is recorded in the web-based application database.

18 Claims, 1 Drawing Sheet

U.S. PATENT DOCUMENTS

| | | | |
|---|---|---|---|
| 5,550,873 A | 8/1996 | Dolev et al. | 375/354 |
| 5,689,688 A | 11/1997 | Strong et al. | 395/553 |
| 5,784,421 A | 7/1998 | Dolev et al. | 375/354 |
| 5,991,771 A * | 11/1999 | Falls et al. | 707/202 |
| 6,055,639 A | 4/2000 | Schanze | 713/201 |
| 6,078,930 A | 6/2000 | Lee et al. | 707/202 |
| 6,301,681 B1 * | 10/2001 | Chen et al. | 714/751 |
| 6,327,630 B1 * | 12/2001 | Carroll et al. | 709/207 |
| 6,647,400 B1 * | 11/2003 | Moran | 707/205 |
| 6,671,701 B1 * | 12/2003 | Chouinard | 707/201 |
| 6,714,979 B1 * | 3/2004 | Brandt et al. | 709/225 |
| 6,856,970 B1 * | 2/2005 | Campbell et al. | 705/35 |
| 2004/0111502 A1 * | 6/2004 | Oates | 709/223 |

OTHER PUBLICATIONS

"Event Composition in Time-Dependent Distributed Systems", C. Liebig, M. Cilia, A. Buchmann, pp. 70-78.

"Time Synchronization Using the Internet", Kenneth W. Monington, JILA, University of Colorado and Judah Levine, JILA, NIST and University of Colorado, Boulder, Colorado , pp. 395-403.

"Time Synchronization over the Internet Using Autolock", 198 IEEE International Frequency Control Symposium, J. Levine, pp. 241-249.

* cited by examiner

WEB-BASED APPLICATION FOR INBOUND MESSAGE SYNCHRONIZATION

FIELD OF THE INVENTION

The present invention relates to a computer-based application for synchronization of messages in electronic commerce (e-commerce) systems. The invention also includes web-based applications for synchronizing inbound messages from other internet related communications systems.

BACKGROUND OF THE INVENTION

Web-based commercial transactions are an important part of e-commerce business activities. There are increasing demands placed on computer applications to integrate the various applications used by businesses in connection with their back office systems. With increases in the amount of web-based transactions and other related activities, there are increased demands for synchronized integration of those various applications.

As the nature and extent of e-commerce activities has evolved, there has been an increased need for integration between Web-based applications and back office back-end systems (including ERP—Enterprise Resource Planning systems). The synchronized transfer of information between the two systems (i.e., in proper time sequence) is an important aspect of system integration. The messages transferred between the two systems must be processed in a manner ensuring that the information contained in those messages is modified or altered in the appropriate time sequence. If the transferred messages are not processed in the proper time sequence, certain important aspects of the transferred information may be lost or incorrectly processed.

In establishing the integration between the two systems, one of the possible approaches is to use messages that are passed back and forth between the Web-based application and the back office system.

It is important that the web-based application have the ability to suitably process inbound messages coming from the back office systems. The types of inbound messages can vary depending on the business needs of the particular business enterprises that are being considered. Some examples of the kinds of inbound messages frequently encountered in a Web-based application are:
  Order Confirmation;
  Order Delivery;
  Order Invoice;
  Product Inventory Updates;
  Product Price Updates; and
  Customer Information Updates.

There are of course, many other types of messages encountered in e-commerce related activities.

If a message queue system is used in transmitting messages between a back office system and one or more network systems, synchronization problems often develop. That is, often, the flow of the messages between the back office and web-based systems becomes asynchronous. The asynchronous messages are often sent and received out of sequence despite their respective times of creation.

One of the issues resulting from asynchronous methods of communication is the unpredictable time of arrival of incoming messages. The unpredictability of these arrival times may in turn lead to unpredictable queuing of incoming messages. There may be undesirable changes to the expected or desired order or sequencing of inbound messages waiting in the queue for processing by the web-based application. Problems may arise in circumstances in which incoming messages are received out of their intended or expected order.

The problem of asynchronous messages may be caused by many different reasons, including for example:
  A document containing important commercial information, (for example, an Order Invoice, Customer Information, or other document), may be updated several times within a relatively short time interval by the back-office systems. Each updated version of the message or revision will typically generate new inbound messages to the Web.
  In a complex communication environment, the revised messages may travel through different data network routes and arrive at the intended destinations at unpredictable times.
  To boost performance, multiple inbound queue server processes may be used.
  The back office system may send out the messages from multiple ports.
  Multi-threaded processing of inbound messages by the Web-based application.

The problem of asynchronous messages may cause more recent data to be overwritten by older data, creating inconsistencies between the Web-based application and the back office system. The web-based application may process incoming messages out of their intended order, resulting in a variety of potentially serious errors in the web-based system.

SUMMARY OF THE INVENTION

The present invention comprises a method of synchronizing inbound messages to avoid the problems associated with the known systems of the prior art. In one aspect, the present invention uses a date and timestamp approach to synchronize the inbound messages eliminating the consistency problems arising from inbound messages being processed out of their proper time sequence. The method also enhances system performance by allowing the use of one or more of the following features:
  Multiple inbound queue server processing.
  Multi-threaded inbound message processing by the Web-based application.
  Multiple ports for sending the messages by the back office system.

In one aspect of the present invention, a web-based software application is provided for synchronizing messages between back office and network based e-commerce applications. The web-based application comprises a reference table. In one example, the reference table may be identified as the MSGSYNCH table, containing the following information:
  The Message Type code for an inbound message is described and stored in the table according to a predetermined selection of message classifications. Each Message Type may be assigned a particular, unique code within the predetermined selection of message classifications.
  A unique Document Number is assigned to each corresponding document of that particular Message Type.
  A timestamp is assigned to each document according to the date and time at which that particular document was originally created or subsequently updated. The timestamp may be stored in part of the inbound message in a code identifying the date and time of creation for that message.

A unique Primary Key is developed for each Message Type and Document Number combination identified within the table. The Primary Key is then used to search the table for comparison with the particular Message Type and Document Number combination corresponding to each inbound message.

The web-based software application of this first aspect of the invention provides a method of comparing and processing inbound messages of the Message Types listed in the table, according to the following steps.

The unique Primary Key of the inbound message is used to search the MSGSYNCH table to locate a matching Primary Key row entry.

If a Primary Key row entry does not exist within the MSGSYNCH table, a new Primary Key row entry is added to the table with information comprising the Message Type, Document Number and Timestamp information corresponding to the inbound message.

If the Primary Key of the inbound message does match an existing Primary Key row entry in the MSGSYNCH table, the Timestamp of the inbound message is compared with the Timestamp of the Primary Key row entry located within the table.

If the timestamp of the matching inbound message is more recent (i.e., newer) than the timestamp of the Primary Key row entry found in the MSGSYNCH table, further processing of the inbound message is continued according to a predetermined process path. The MSGSYNCH table is updated with the document in the more recent inbound message. The timestamp information is also updated to reflect the timestamp of the more recent document.

If the timestamp of the inbound message is not more recent than the timestamp of the located Primary Key row entry, the inbound message is not processed further according to the predetermined process path.

In some applications, the application may provide an added step to log an error in those instances where an out of sequence message has been received. In some instances, the application may be configured to ignore the asynchronous message. Other variations are also possible for the further processing of such messages.

As an example of another embodiment, the invention provides a computer program product for use with a web-based application. The web-based application comprises an inbound message processor for multi-threaded processing of document messages. In other embodiments, it may be preferable to provide an alternative type of inbound message processor. The web-based application also comprises a web-based application database in communication with the inbound message processor. The computer program product also comprises:

a recording medium;

means, recorded on the recording medium, for operating the web-based application database to maintain inbound document message information comprising primary key codes and said timestamps for selected document messages previously received by the web-based application database;

means, recorded on the recording medium, for comparing the primary key code of a new inbound document message received by the web-based application database with primary key codes maintained in the web-based application database for the previously received document messages;

means, recorded on the recording medium, for selecting a pair of corresponding document messages by identifying any one previously received document message having a primary key code corresponding with the primary key code of the new inbound message;

means, recorded on the recording medium, for selecting a unique new inbound document message by identifying any new inbound document message with a primary key code which does not correspond to any of the primary key codes maintained in the web-based application database;

means, recorded on the recording medium, for identifying the more recent document message in the message pair of corresponding document messages by comparing the timestamp of the previously received document message in the message pair with the timestamp of the new inbound message in the message pair; and means, recorded on the recording medium, for updating the web-based application database to record: the inbound document message information for the more recent document message and the unique inbound document message; and the timestamps for the more recent and unique document messages.

In some instances, the recording medium may be a magnetic storage device. In certain specific instances the magnetic storage device may be a magnetic disk, CD-ROM, hard drive or other device. Other embodiments will be readily apparent to persons skilled in the art.

A method of operating a web-based system is provided. In one aspect of the invention, the method of the invention is used to synchronize communications messages between a first back office system and a web-based application database. Typically, the first back office system comprises a first back office database and a plurality of nodes for creating documents. The nodes communicate with the first back office database. The documents created in the back office system are each identified with a primary key code and a timestamp designating the time of creation of each document. The back office system subsequently generates document messages. Each document message comprises one of the documents along with the primary key code and timestamp information for that document. The method of synchronizing messages in this system comprises the steps of:

operating the web-based application database to maintain inbound document message information comprising primary key codes and said timestamps for selected document messages previously received by the web-based application database;

comparing the primary key code of a new inbound document message received by the web-based application database with primary key codes maintained in the web-based application database for the previously received document messages;

selecting a pair of corresponding document messages by identifying any one previously received document message having a primary key code corresponding with the primary key code of the new inbound message;

selecting a unique new inbound document message by identifying any new inbound document message with a primary key code which does not correspond to any of the primary key codes maintained in the web-based application database;

identifying the more recent document message in the message pair of corresponding document messages by comparing the timestamp of the previously received document message in the message pair with the timestamp of the new inbound message in the message pair; and updating the web-based application database to record: the inbound document message information for the more recent document message and the unique inbound document message; and the timestamps for the more recent and unique document messages.

In a further aspect of this invention, a web-based system is provided in which the described method is implemented. By way of example, a web-based system is provided wherein the system comprises:

means for multi-threaded processing of inbound document messages, and a web-based application database in communication with the inbound message processing means;

means for operating the web-based application database to maintain inbound document message information comprising primary key codes and said timestamps for selected document messages previously received by the web-based application database;

means for comparing the primary key code of a new inbound document message received by the web-based application database with primary key codes maintained in the web-based application database for the previously received document messages;

means for selecting a pair of corresponding document messages by identifying any one previously received document message having a primary key code corresponding with the primary key code of the new inbound message;

means for selecting a unique new inbound document message by identifying any new inbound document message with a primary key code which does not correspond to any of the primary key codes maintained in the web-based application database;

means for identifying the more recent document message in the message pair of corresponding document messages by comparing the timestamp of the previously received document message in the message pair with the timestamp of the new inbound message in the message pair; and means for updating the web-based application database to record: the inbound document message information for the more recent document message and the unique inbound document message; and the timestamps for the more recent and unique document messages.

BRIEF DESCRIPTION OF THE DRAWINGS

The preferred embodiment of the present invention is explained in connection with the network system illustrated in FIG. 1. FIG. 1 is a flow chart illustrating a schematic representation of an integrated network system to assist in the explanation of one aspect of the present invention.

DETAILED DESCRIPTION OF THE DRAWINGS

Figure 1:
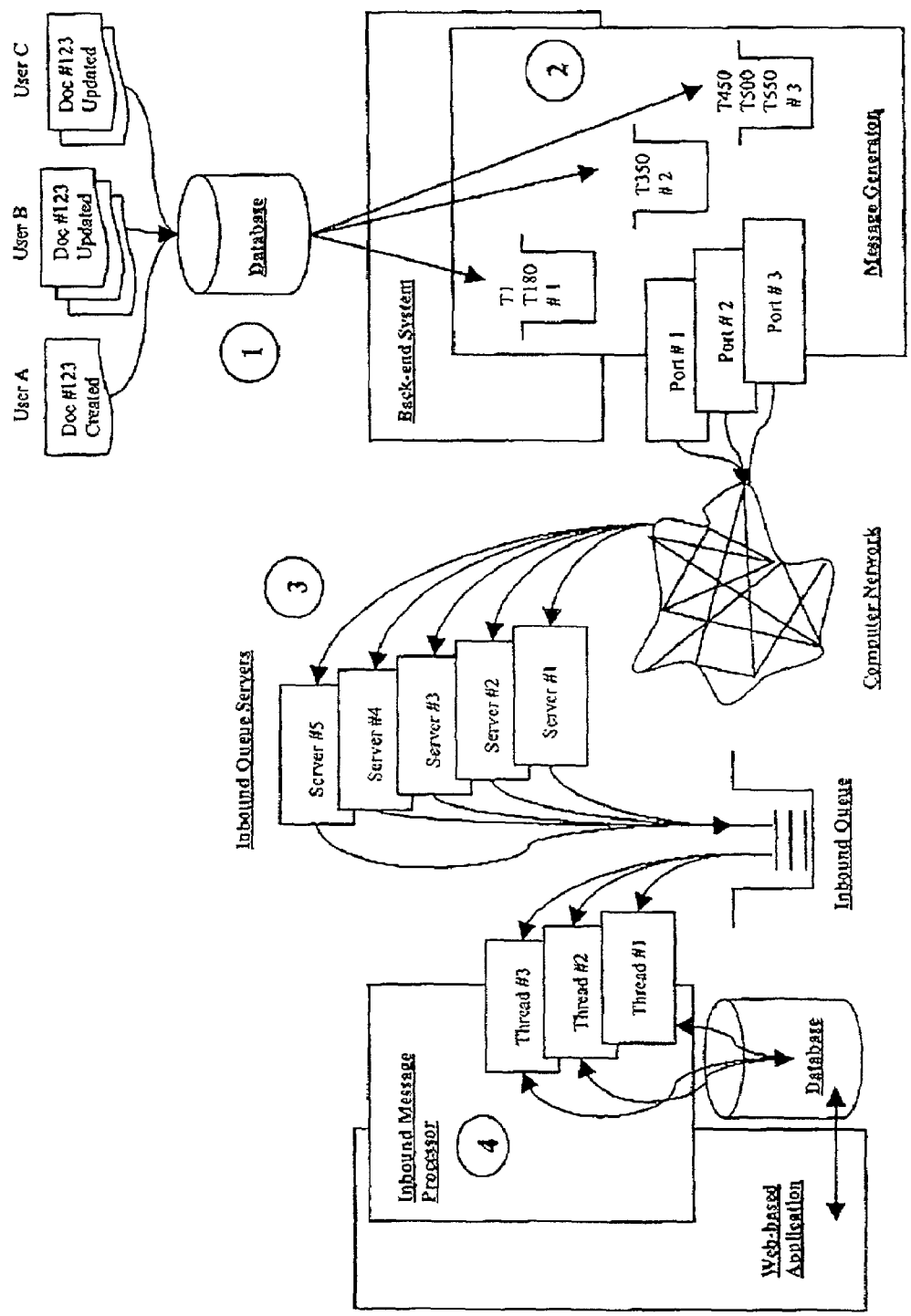
FIG. 1 shows a web-based application integrated with a corresponding back office system.

FIG. 1 depicts a web-based application which is integrated with a back office system. In the illustrated system, the back office application is programmed to identify the following document types as follows:

| Order Confirmation | (code) 1 |
| Order Delivery | (code) 2 |
| Order Invoice | (code) 3 |
| Product Inventory Updates | (code) 4 |
| Product Price Updates | (code) 5 |
| Customer Information Updates | (code) 6 (and so on.) |

With reference to the back office system components illustrated in section 1 of FIG. 1, a document of Document Type 2 (i.e., an Order Delivery) with a Document Number 123 is created by User A at a corresponding terminal or node. The document is created with a Timestamp T1. The document information (including the Timestamp T1) is stored in the back office system database. The same document is then updated three times by User B at another terminal with recorded Timestamps of T180, T500, and T550. The same document is updated by User C at a third terminal with recorded Timestamps T350 and T450. New copies of the document are created and stored in the back office system database for each of the five updated copies of the original Order Delivery document. The timestamp for each corresponding document is stored in the document record maintained within the database. The timestamp information is maintained in the corresponding messages generated by the message generator component of the system shown as section 2 in FIG. 1.

In this example, for simplicity, the form of Timestamp designation Tn represents an n-th document creation or updating action carried out at the back office system. Using this example, a Timestamp of T180 corresponds to the $180^{th}$ processing action (i.e., creating or updating various documents) within the back office system. The document with recorded timestamp T180 is stored in the back office database.

As noted previously, Section 2 of FIG. 1 shows a schematic representation of a message generator component of the back office system. The representation depicts the following steps in processing the document information. At a pre-scheduled time, a batch job is run at the back office end of the system to collect all new and updated documents stored in the back office database. Assume that in this example, there are 600 document creation and update actions collected by this batch job at the pre-scheduled time and that there are three ports (Port #1, Port #2, Port #3) used to convert or generate messages to be sent out to the web-based application through the network. In this example, each of the three ports has a corresponding buffer (buffer 1, buffer 2, buffer 3) with storage limited to a maximum of 200 documents. Each of the three ports assigns a Message Number to each created or updated message retrieved from a shared pool for the three ports. In this example, the following situation would occur.

Buffer 1 for Port #1 would contain documents with timestamps ranging from T1 to T200. In this example, the original Order Delivery document T1 created by User A and update T180 made by User B are contained in buffer 1. Buffer 2 for Port #2 would contain documents with timestamps ranging from T201 to T400. In this example, buffer 2 contains the document updated by User C at T350. Buffer 3 for Port#3 contains documents with timestamps ranging from T401 to T600. In this example, buffer 3 contains documents updated by User B at timestamps T500 and T550 and the document updated by User C at timestamp T450.

For the purposes of this example, it is assumed that the three ports start generating (sending) messages at the same time and that all three ports generate (send) messages at the same rate. Based on these circumstances, it will be appreciated that the messages will be generated in an asynchronous manner as follows.

The document created by User C at timestamp T450 would be generated before the update created by User B at timestamp T180 and the updated document created by user C at timestamp T350. As a result, document T450 would be assigned a lower message number by the ports than the other two messages, T180 and T350. The document updated at T550 would be generated about the same time as the document updated at T350. The message Numbers assigned to these two documents would be close together. There is a possibility that document T350 would have a Message Number that is higher than document T550 and which would result in the messages being asynchronous (i.e., out of sequence).

The document updated at T550 would be generated before the document updated at T180, with document T550 having a smaller Message Number. In this scenario, the updated document T180 would be generated (sent) last though Port #1. This same document would have the largest Message Number for the particular Document Number, resulting in the messages being asynchronous (i.e., out of sequence).

Since there are three ports sending messages to the five inbound queue servers shown in section 3, the inbound messages will be received and processed out of sequence. There may be at least two additional reasons for this problem. The various message updates relating to this message type will travel from different ports, with each message traveling through an unpredictable network path. There are multiple inbound queue servers and each of the five server processes may receive and place the older messages into the inbound queue after the more recent messages are placed into the inbound queue.

The use of multi-threaded inbound message processing would speed up system performance. However, the sequence of the messages would be disrupted if the time required to process each message differs due to resource allocation by the application.

In the preferred embodiment of the present invention, a web-based application is provided for synchronizing messages between back office and network based e-commerce applications. The web-based software application comprises a reference table. In one example, the reference table may be identified as the MSGSYNCH table and containing the following information:

The Message Type code for an inbound message is described and stored in the table according to a predetermined selection of message classifications. The Message Type may be developed according to the particular needs of the web-based system being considered.

For example, in some instances, the type of inbound messages may be described as an Order Confirmation message, an Invoice message, an Order Delivery message, and other categories selected for the particular system. Each Message Type may be assigned a particular, unique code within the predetermined selection of message classifications.

A unique Document Number is assigned to each corresponding document of that particular Message Type. For example, a particular Order Confirmation document will be assigned a corresponding, unique order number. As another example, a particular Order Invoice will be assigned a corresponding, unique invoice number.

A timestamp is assigned to each document according to the date and time at which that particular document was originally created or subsequently updated. The timestamp is not assigned according to the time that the document was sent by the back office system. Rather, the timestamp is used to identify the date and time corresponding to the creation of the original or a revised version of the document. The timestamp may be stored in part of the message in a code identifying the date and time of creation for that message. For example, the code may be generated in a format corresponding to HH:MM:SS, with preceding codes for the corresponding creation date. As noted, the resulting timestamp code may be stored in part of the related inbound message.

A unique Primary Key is developed for each Message Type and Document Number combination identified within the table. The Primary Key is then used to search the inbound message data stored within the table for comparison with the particular Message Type and Document Number combination corresponding to each inbound message.

The web-based application of this preferred embodiment provides a method of comparing and processing inbound messages of the Message Types listed in the table, according to the following steps.

The unique Primary Key of the inbound message is used to search the MSGSYNCH table to locate a matching Primary Key row entry.

If a Primary Key row entry does not exist within the MSGSYNCH table, a new Primary Key row entry is added to the table with information comprising the Message Type, Document Number and Timestamp information corresponding to the inbound message.

If the Primary Key of the inbound message does match an existing Primary Key row entry in the MSGSYNCH table, compare the Timestamp of the inbound message with the Timestamp of the Primary Key row entry located within the table.

If the timestamp of the inbound message is more recent (i.e., newer) than the timestamp of the Primary Key row entry found in the MSGSYNCH table, continue processing the inbound message according to a predetermined process path. The web-based application database is updated with the document in the more recent inbound message. The timestamp information in the MSGYNCH table is also updated to reflect the timestamp of the more recent document.

If the timestamp of the inbound message is not more recent than the timestamp of the located Primary Key row entry, the inbound message is not processed further according to the predetermined process path.

In some applications, the application may provide an added step to log an error in those instances where an out of sequence message has been received. In some instances, the application may be configured to ignore the asynchronous message. Other variations are also possible for the further processing of such messages.

Those persons skilled in the art will understand that a web-based application may be established to operate using the software embodying the method described herein. The invention also provides a computer program product to operate a web-based system in accordance with the steps outlined in this description. In a further aspect of this invention, a web-based system is provided in which the described method is implemented. Further embodiments of the present invention will be apparent to persons skilled in the art. It will be understood that certain aspects of the method, system and computer program product may be modified or varied without departing from the scope of the invention described herein. Accordingly, such modifications and variations will be considered to be included in the invention as described.

By implementing the method, system or computer program product outlined in this disclosure, a Web-based application for processing of inbound messages may be operated to maintain the consistency of the information on both systems.

In addition, the method, system or computer program product of the invention may provide significantly improved performance by incorporating the use of multiple inbound queue server processes, multiple ports generating the messages in the back office system and multi-threaded processing in the Web-based application. The invention accommodates the use of the indicated features in a manner which allows processing of various inbound messages in proper sequence.

The invention claimed is:

1. A method of synchronizing communications messages between a first back office system and a web-based application in a computer network, wherein the first back office system comprises a first back office database and a plurality of nodes for creating documents, the nodes communicating with the first back office database, the documents each being identified with a primary key code and a timestamp designating the time of creation of each document, and the back office system generates document messages, the document messages each comprising one of the documents and primary key code and timestamp information for the one of the documents, the method comprising the steps of:
    receiving in the web-based application a stream of the document messages from the first back office system, wherein the document messages transfer information about changes to data in the first back office system for integrating the first back office system and the web-based application;
    operating a database of the web-based application to maintain inbound document message information comprising primary key codes and said timestamps for selected document messages previously received by the web-based application database;
    comparing the primary key code of a new inbound document message received by the web-based application database with primary key codes maintained in the web-based application database for the previously received document messages;
    selecting a pair of corresponding document messages by identifying any one previously received document message having a primary key code corresponding with the primary key code of the new inbound message;
    selecting a unique new inbound document message by identifying any new inbound document message with a primary key code which does not correspond to any of the primary key codes maintained in the web-based application database;
    identifying the more recent document message in the selected pair of corresponding document messages by comparing the timestamp of the previously received document message in the message pair with the timestamp of the new inbound message in the message pair; and
    updating the web-based application database to record: the inbound document message information for the more recent document message, the unique inbound document message; and the timestamps for the more recent and the unique inbound document messages,
    wherein the method is adapted to process the document messages in a synchronous time sequence even if the timestamp of the previously received document message is more recent than the timestamp of the new inbound message.

2. The method of claim 1 wherein the primary key comprises document type information and document identification information.

3. The method of claim 2 wherein the inbound document messages are communicated to an inbound queue prior to communication to the web-based application database.

4. The method of claim 2 wherein the inbound document messages are communicated to a multi-threaded inbound message processor prior to communication to the web-based application database.

5. The method of claim 2 wherein the inbound document messages are generated by a multi-port message generator.

6. The method of claim 2 further comprising logging an error when a new inbound message in a selected pair of corresponding document messages does not have the more recent timestamp in the selected pair.

7. The method of claim 6 further comprising identifying the new inbound message in a selected pair of corresponding document messages which does not have the more recent timestamp in the selected pair and segregating said new message from further processing according to a predetermined process path.

8. A computer program product for use with a web-based application, the computer program product comprising:
    a recording medium;
    means, recorded on the recording medium, for receiving in an inbound message processor of the web-based application a stream of inbound document messages, wherein the inbound document messages transfer information about changes to data in a sender of the inbound document messages for integrating the sender of the inbound document messages and the web-based application;
    means, recorded on the recording medium, for operating a web-based application database in the web based application and in communication with the means for receiving to maintain inbound document message information comprising primary key codes and corresponding timestamps for selected document messages previously received by the web-based application database;
    means, recorded on the recording medium, for comparing the primary key code of a new inbound document message received by the web-based application database with primary key codes maintained in the web-based application database for the previously received document messages;
    means, recorded on the recording medium, for selecting a pair of corresponding document messages by identifying any one previously received document message having a primary key code corresponding with the primary key code of the new inbound message;
    means, recorded on the recording medium, for selecting a unique new inbound document message by identifying any new inbound document message with a primary key code which does not correspond to any of the primary key codes maintained in the web-based application database;
    means, recorded on the recording medium, for identifying the more recent document message in the message pair of corresponding document messages by comparing the timestamp of the previously received document message in the message pair with the timestamp of the new inbound message in the message pair; and means, recorded on the recording medium, for updating the web-based application database to record: inbound document message information for the more recent document message; inbound document message information for the unique inbound document message; and the timestamps for the more recent and the unique inbound document messages, wherein the program product is adapted to process the inbound document messages in a synchronous time sequence even if the timestamp of the previously received document message is more recent than the timestamp of the new inbound message.

9. The product in claim 8 wherein the web-based application comprises an inbound message processor for multi-threaded processing of document messages, the document messages being generated by a back office system.

10. The product in claim 9 wherein each of the document messages generated by the back office system comprises a corresponding document, a primary key code for the corresponding document and a timestamp designating the time of creation of the corresponding document.

11. The product in claim 10 wherein the recording medium is a magnetic storage device.

12. A web-based system for communication with a back office system, the back office system comprising a back office database and a plurality of nodes for creating documents, the nodes communicating with the back office database, the documents each being identified with a primary key code and a timestamp designating the creation of each document, the back office system generating document messages, each of the document messages comprising one of the documents and the primary key code and the timestamp for the one of the documents, the web-based system comprising:

an inbound message processor for processing a stream of document messages received from the back office system, wherein the document messages transfer information about changes to data in the back office system for integrating the back office system and the web-based application;

a web-based application database in communication with the inbound message processor;

means for operating the web-based application database to maintain inbound document message information comprising primary key codes and timestamp for selected document messages previously received by the web-based application database;

means for comparing the primary key code of a new inbound document message received by the web-based application database with primary key codes maintained in the web-based application database for the previously received document messages;

means for selecting a pair of corresponding document messages by identifying any one previously received document message having a primary key code corresponding with the primary key code of the new inbound message;

means for selecting a unique new inbound document message by identifying any new inbound document message with a primary key code which does not correspond to any of the primary key codes maintained in the web-based application database;

means for identifying the more recent document message in the message pair of corresponding document messages by comparing the timestamp of the previously received document message in the message pair with the timestamp of the new inbound message in the message pair; and means for updating the web-based application database to record: the inbound document message information for the more recent document message; the inbound document message information for the unique inbound document message; and the timestamps for the more recent and the unique inbound document messages, wherein the system is adapted to process the document messages in a synchronous time sequence even if the timestamp of the previously received document message is more recent than the timestamp of the new inbound message.

13. The web-based system claimed in claim 12, wherein the inbound message processor provides multi-threaded processing of document messages.

14. The web-based system claim in claim 13, wherein the primary key codes comprise document type information and document identification information.

15. The method of claim 2, wherein the document type information includes at least one of order confirmation, order delivery, order invoice, product inventory updates, product price updates and customer information updates.

16. The product in claim 10, wherein the primary key code comprises document type information and document identification information.

17. The product in claim 16, wherein the document type information includes at least one of order confirmation, order delivery, order invoice, product inventory updates, product price updates and customer information updates.

18. The web based system of claim 14, wherein the document type information includes at least one of order confirmation, order delivery, order invoice, product inventory updates, product price updates and customer information updates.

* * * * *